May 15, 1928.  
R. A. BLISH ET AL  
1,669,689  
DRINK MIXER  
Filed July 3, 1925  
2 Sheets-Sheet 1
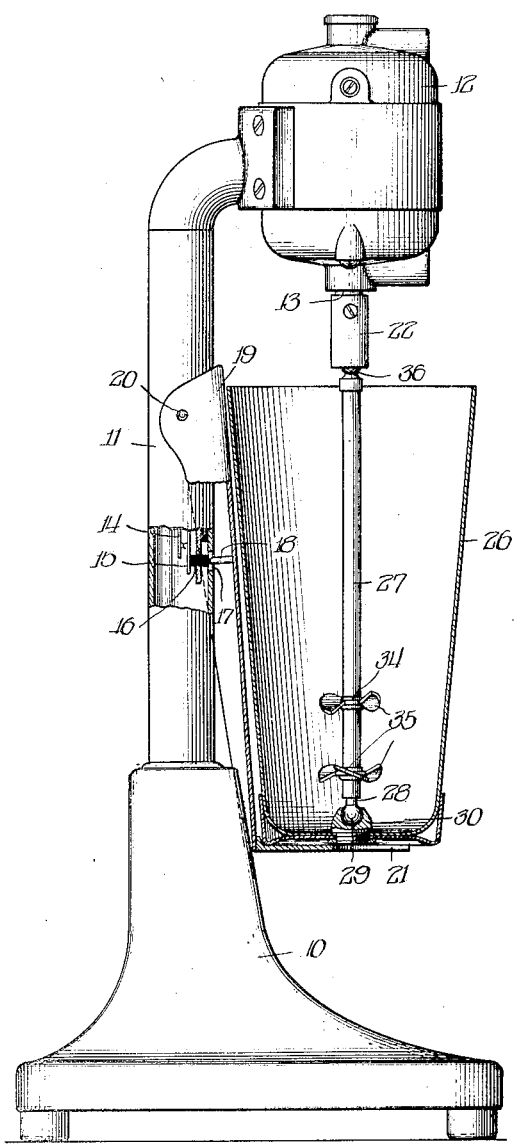
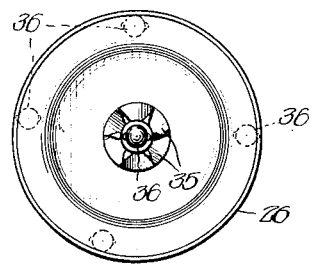
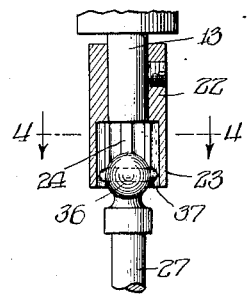
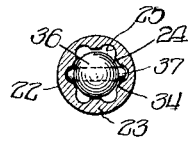
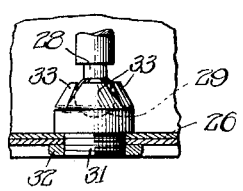
Inventors:  
Russell A. Blish,  
Stephen J. Poplawski,  
Williams, Bradbury,  
McCaleb & Hinkle Attys May 15, 1928.  
R. A. BLISH ET AL  
DRINK MIXER  
Filed July 3, 1925  
1,669,689  
2 Sheets-Sheet 2
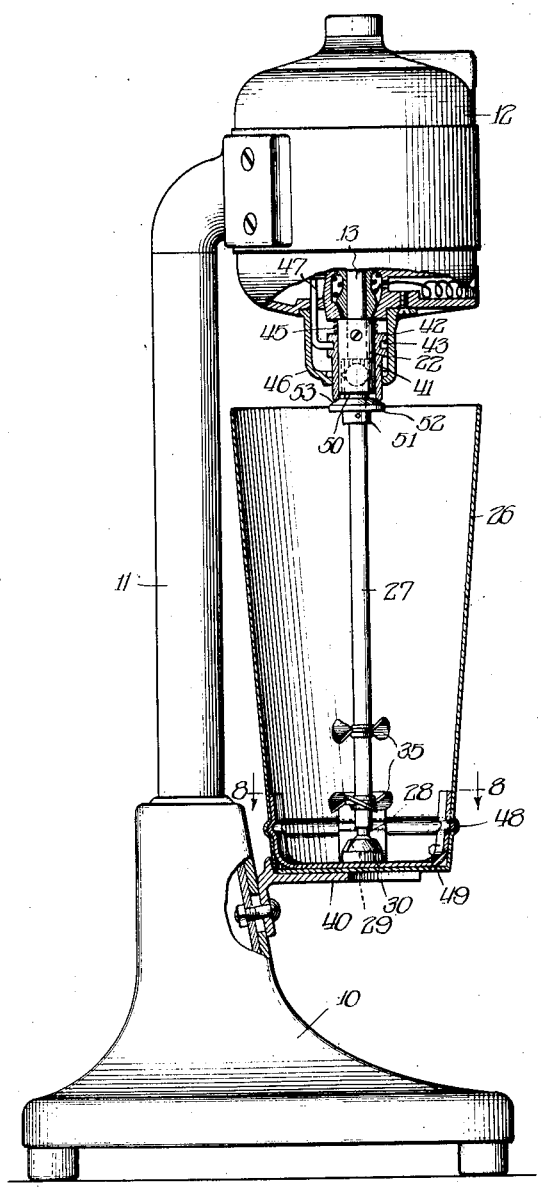
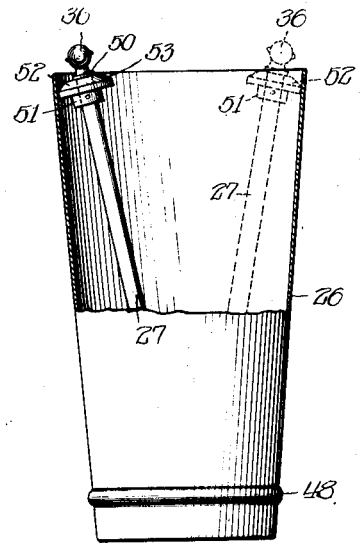
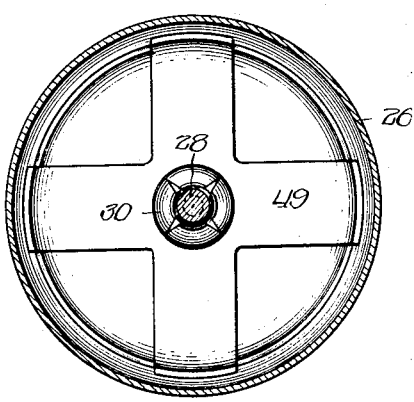
Inventors:
Russell A. Blish,
Stephen J. Poplawski,
Williams, Bradbury,
McCaleb & Hinkle Attys Patented May 15, 1928.

1,669,689

UNITED STATES PATENT OFFICE.

RUSSELL A. BLISH AND STEPHEN J. POPLAWSKI, OF RACINE, WISCONSIN, ASSIGNORS TO ARNOLD ELECTRIC COMPANY, OF RACINE, WISCONSIN, A CORPORATION OF WISCONSIN.

DRINK MIXER.

Application filed July 3, 1925. Serial No. 41,242.

Our invention relates to mixers such as are used to commingle the ingredients of beverages sold at soda fountains, and is concerned with the provision of certain improvements applicable to drink mixers embodying the generic invention disclosed in our Patent No. 1,529,830 dated March 17, 1925.

In our prior patent aforesaid is disclosed a drink mixer comprising two principal units, namely, a driving and supporting unit comprising a supporting standard and an overhead motor, and a container-agitator unit comprising an open top receptacle wherein and whereon is mounted an agitator unit to be detachably connected with and driven by the motor when the receptacle is mounted on the standard, the agitator being adapted to be manipulated by and with the receptacle and to maintain its position therein in all positions which the receptacle may assume during rinsing and use.

Generally speaking, our present invention provides a drink mixer possessing the generic characteristics mentioned in the preceding paragraph and is otherwise characterized as follows:

(a) The rotary agitator element, when in operation, is disposed in the approximate center of the receptacle by which it is carried, but nevertheless does not constitute any material obstruction to the introduction of ice, hard ice cream, or other beverage ingredient into the receptacle.

(b) The rotary agitator element when detached from the motor may assume a position, or positions, wherein the upper portion of the agitator lies immediately adjacent the upper edge of the receptacle.

(c) Any part of the receptacle side wall may be presented to the standard in effecting the coupling of the agitator to the motor and the placement of the container-agitator unit on the standard.

(d) The agitator shaft has but a single bearing in the receptacle, that is a thrust bearing adjacent the bottom of the receptacle.

(e) No part of the burden of holding the receptacle against lateral displacement is thrown upon the agitator or any other means located above the bottom of the receptacle.

Other features, objects and advantages of the present invention will appear from the following detailed description wherein reference is made to the accompanying drawings in which:

Figure 1 is a side view, partly in elevation and partly in section, of a drink mixer embodying our present invention;

Figure 2 is a top plan view of the container-agitator unit, the agitator shaft being shown in the upright position which it maintains only when in driven relation to the motor, the dotted lines illustrating several of the many positions adjacent the upper edge of the receptacle which the upper end of the agitator shaft may assume during manipulation of the container-agitator unit;

Figure 3 is a fragmentary view, partly in section, illustrating the co-operating clutch members with which the motor and agitator shaft are provided;

Figure 4 is a horizontal section taken on the line 4—4 of Figure 3;

Figure 5 is a fragmentary view illustrating the agitator thrust bearing in some detail;

Figure 6 is a view generally corresponding to Figure 1 but illustrating a modified embodiment of our invention;

Figure 7 is an elevational view of the container-agitator unit with a portion of the receptacle broken away for the purpose of clearness in illustration, and Figure 8 is a horizontal section taken on the line 8—8 of Figure 6.

Referring first to Figure 1, reference numeral 10 represents a base adapted to rest upon a counter or the like and rising from this base is a hollow standard 11 which at its upper end supports an electric motor 12. The armature shaft of this motor, indicated at 13, is vertically disposed and projects downwardly in spaced and overhanging relation to the receptacle support hereinafter to be mentioned. The conductors through which energy is supplied to the motor 12 are led upwardly through the base 10 and standard 11, the motor circuit being controlled by a pair of contact springs 14 and 15. The natural tendency of the contact spring 15 is to move out of electrical engagement with the spring 14 and thus to open the motor circuit.

It will be noted that the contact spring 15 carries a button 16 of insulating material which lies opposite an aperture 17 in the standard and in the path of a pin 18 which projects rearwardly from and constitutes a fixed part of a receptacle support indicated at 19. The upper end of this receptacle support is pivoted at 20 to the standard for a few degrees of movement around a horizontal axis. Forming a fixed part of the lower end of the receptacle support 19 is a horizontal shelf 21 which is so shaped and is of such dimensions that the hereinafter mentioned receptacle may rest thereon without requiring the use of any additional means for preventing lateral displacement thereof from the receptacle support. When the said receptacle is not on the support 19 the motor circuit is open due to the inherent tendency of the spring contact 15 to separate from its associated spring contact 14. However, when the support 19 is carrying the receptacle and its contents, the pressure of the pin 18 against the element 16 positively holds the contact springs in engagement with each other and thus maintains the closure of the motor circuit.

Fixed to the motor shaft 13 is a sleeve 22 which has its lower end 23 conformed to constitute one of a pair of co-operating clutch members, the other of these clutch members being carried by the upper end of the agitator forming part of the container-agitator unit presently to be described. It will be noted that the portion 23 of the sleeve 22 is provided with a central bore or passage 24 in the wall of which is formed a plurality of equidistantly spaced semi-circular grooves 25. The details of this clutch element and its co-operating agitator-carried clutch element are specifically claimed in a co-pending application of Stephen J. Poplawski.

Having now described the essential features of the supporting and driving unit, we now direct particular attention to the improved container-agitator unit with which the present invention is most particularly concerned.

The container-agitator unit comprises a receptacle or cup 26 which is preferably formed of metal and which is open at the top. This receptacle is adapted to rest upon the shelf 21 of the support 19 and to maintain its position on said support, as illustrated in Figure 1, without the assistance of any additional means for preventing its lateral displacement.

Associated with the receptacle 26 is an agitator comprising a shaft 27 which, when the agitator is in use, preferably occupies the approximate center of the receptacle 26 as is illustrated in Figure 1. Formed integral with the lower end of the shaft 27, or having a forced fit in a bore in the lower end of the said shaft 27, is a stem 28 having a spherical portion 29 constituting one element of a ball and socket joint which acts as a combination radial and thrust bearing when the agitator is in use and which acts to prevent separation of the agitator from the receptacle notwithstanding any position which the latter may assume during rinsing or at any other time while out of association with the supporting and driving unit. The other element of this ball and socket joint comprises the socket element 30 having a reduced lower portion 31 which extends through a central aperture in the receptacle bottom. A nut 32 co-operates with the portion 31 of the socket member firmly to hold the same in position and to prevent the escape of any liquid through the bottom of the receptacle. The socket member is of course provided with a suitable depression to co-operate with the spherical portion 29 of the agitator and is also provided with a plurality of fingers 33 which are caused to embrace the spherical portion 29 to prevent its withdrawal from the socket without, however, preventing free rotation of the shaft 27 or deflection of the upper end of the shaft 27 to any position around the upper edge of the receptacle 26.

The shaft 27 carries a pair of vertically spaced stirring elements, each of which comprises a collar 34 having a forced fit on the shaft 27 and a plurality of blades 35 which are suitably inclined so as to direct the contents of the receptacle downwardly when the agitator shaft is being driven by the motor. We prefer to have the several blades 35 similarly inclined but it would of course be understood that the blades of the upper stirring element may be so inclined as to cause a downward flow while the blades of the lower stirring element are causing an upward flow. Each of the stirring elements preferably comprises three of the blades 35, the blades of each of the stirring elements being staggered relative to the blades of the other stirring element.

The agitator shaft 27 is provided with a spherical upper portion 36 provided with a horizontal bore in which tightly fits a pin 37, the ends of this pin projecting from the surface of the spherical element 36 and being rounded so as to constitute in effect diametrically opposite semi-spherical protuberances on the spherical surface of the shaft portion 36. The spherical shaft portion 36 is such size as to fit snugly within the bore 24 of the co-operating clutch member 23, the pin ends 37 being adapted to engage in any diametrically opposite pair of the semi-cylindrical recesses 25.

The receptacle 26 usually rests on a table or counter when the ingredients of a drink are placed therein. At this time the upper end of the agitator shaft 27 occupies a position against the upper edge of the receptacle and thus constitutes no material obstruction to the introduction of such ingredients as particles of ice, hard ice cream, etc. After the ingredients of the drink have been placed in the receptacle the operator grasps any part of the side wall of the receptacle which may be most convenient to his hand. By tilting the upper edge of the receptacle very slightly from the horizontal the operator may cause the upper end of the agitator shaft to assume any position around the upper edge of the receptacle. Usually the agitator shaft will be caused to take a position against the portion of the receptacle which lies opposite the portion grasped by the hand of the operator. With the agitator shaft in this position the operator causes the agitator clutch element to enter the cooperating clutch element on the motor shaft and then permits the receptacle 26 to rest upon the supporting shelf 20 as illustrated in Figure 1. The weight of the receptacle and its contents causes the motor circuit to be closed in the manner previously described. During operation of the agitator shaft the latter is held in the vertical position shown in Figure 1. Removal of the container agitator unit from the supporting driving unit of course permits separation of the contact springs 14 and 15 and causes the motor to cease operating.

It will be understood from the foregoing that the particular type of container-agitator unit just described is particularly advantageous because notwithstanding that it has a centrally located agitator, the latter does not afford any material obstruction to the introduction of ingredients into the receptacle. Furthermore, this type of container-agitator unit is desirable because the operator need not take care to grasp any particular portion of the container-agitator unit when about to place the same in operative relation to the supporting and driving unit.

The drink mixer just described, like the drink mixer of our prior patent aforesaid, is of course highly advantageous from the sanitary standpoint because when the mixer is not in use there is no sticky mixing rod depending from the motor to collect dust or attract flies. Since the agitator and the receptacle constitute a unit, the agitator is necessarily washed when the receptacle is washed and is likewise protected from dust and dirt by the walls of the receptacle when the latter is not in use and is out of association with the supporting and driving unit.

The embodiment of our invention illustrated in Figures 6 to 8 inclusive, differs most essentially from the drink mixer illustrated in the preceding figures in that the receptacle supporting shelf is an immovable part of the supporting and driving unit and in the further respect that modified means is employed for retaining the agitator in the receptacle. In describing the mechanism of Figures 6 to 8 we shall very largely confine our discussion to those features of the mechanism which distinguish it from the embodiment of our invention shown in the preceding figures.

In this modified construction the receptacle-supporting shelf, indicated at 40 is rigidly attached to the base 10 by a screw or screws as illustrated. When this immovable type of shelf is employed the means for controlling the motor circuit is preferably located within the motor housing and is controlled by instrumentalities associated with the clutch element of the motor and actuated by the agitator. By reference to Figure 6 is will be noted that a vertically reciprocating sleeve 41 is disposed around the clutch sleeve 22, the two sleeves being relatively rotatable. This vertically reciprocating sleeve 41 is provided with an annular shoulder 42 in which is formed an annular groove 43. The coil spring 45 disposed around the sleeve 22 and acting between one of the motor shaft bearings and the sleeve 41 at all times tends to move the latter downwardly. Downward movement of the sleeve 41 is prevented by engagement of the shoulder 42 with an extension of the motor housing illustrated at 46. Engaging in the annular groove 43 is the offset end of a vertically reciprocating stem 47 which is the operating element for a switching mechanism (not shown) located within the motor housing. The details of the switching mechanism are not illustrated as they constitute part of the subject matter claimed in a copending application of Stephen J. Poplawski. Suffice it is to say that when the agitator unit is disassociated from the supporting and driving unit, the sleeve 41 occupies its lowermost position, in which event the circuit of the motor is open. However, when the sleeve 41 is moved against the pressure of spring 45 to the position shown in Figure 6, the circuit of the motor is closed.

Referring now to the receptacle shown in Figures 6 to 8, it will be noted that the latter is provided near its lower end with a circumferential bead 48, the formation of which provides an annular groove on the inside of the receptacle adapted frictionally to be engaged by beads formed on the arms of a spider 49 which fits firmly against the bottom of the receptacle. The spider 49 carries the socket element of a ball and socket bearing which need not differ in any material respect from the corresponding element illustrated in Figures 1 to 5 inclusive. The spider by its frictional connection with the receptacle serves to retain the agitator in the receptacle during all of the positions which the latter may assume during rinsing or use. The use of the spider, however, facilitates detachment of the agitator from the receptacle whenever occasion for so doing arises and also eliminates the requirement for an aperture of any sort at the bottom of the receptacle.

It will be noted that the upper part of the agitator shaft is provided with a shoulder 50 between which and a collar 51, which is fixed to the agitator shaft, is a rotatable collar 52 which is provided with an annular beveled surface 53.

When the container-agitator unit of Figures 6 to 8 is moved into co-operative relationship with the supporting and driving unit the rotatable collar 52 engages the spring-pressed sleeve 41 and holds the same in its circuit-closing position. At this time the collar 52 remains stationary, the agitator shaft rotating freely therein.

Having thus illustrated and described two representative embodiments of our invention, and without limiting ourselves to the precise construction and arrangement of parts herein shown and described, what we claim as new and desire to secure by Letters Patent of the United States is:—

1. In a drink mixer, a container-agitator unit comprising an open top receptacle having a rotatable agitator disposed therein, said agitator being connected to said receptacle for manipulation by and with the receptacle in rinsing and use by being pivoted by a ball and socket for rotation and lateral tilting in the lower central portion of said receptacle, said agitator being adapted to have its upper end detachably connected with the driving motor.

2. In a drink mixer, a container-agitator unit comprising an open top receptacle having a rotatable agitator disposed therein, and provided with a bearing in the lower central portion thereof, said bearing serving to hold the agitator in the receptacle in the several positions which the receptacle assumes during rinsing and use, and permitting the upper end of the agitator to take a position against the upper edge of the receptacle, the upper end of said agitator being adapted to be detachably connected to the driving motor.

3. In a drink mixer, a container-agitator unit comprising an open top receptacle having a rotatable agitator disposed therein, said agitator being journaled for rotation and universal tilting in the lower central portion of the receptacle by a ball and socket, the upper end of the receptacle being adapted for detachable connection to a driving motor.

4. In a drink mixer, a container-agitator unit comprising an open top receptacle having a rotatable agitator disposed therein, said agitator being connected to said receptacle by a ball and socket joint located in the lower central portion of the receptacle and permitting rotation of the agitator in the receptacle and universal lateral tilting of the agitator in the receptacle, said agitator having its upper end adapted for detachable connection with the driving motor.

5. In a drink mixer, a support comprising a horizontal shelf adapted without assistance to support a receptacle resting thereon, a motor having a vertical shaft overhanging said shelf, an open top receptacle adapted to rest on said shelf, a rotatable agitator disposed in said receptacle and having its lower end held in by a bearing which permits rotation of the agitator and deflection of its upper end to the side wall of the receptacle, and clutch means carried by the motor shaft adapted to co-operate with the upper end of the agitator to center the latter in the receptacle and to drive said agitator by the motor.

6. In a drink mixer, the combination of a motor having a downwardly projecting shaft, a shelf located under and spaced from the motor, constituting the sole means for supporting a receptacle resting thereon, a container-agitator unit comprising an open top receptacle and a rotatable agitator located in and connected with said receptacle by a ball and socket bearing permitting rotation of said agitator in the receptacle and deflection of its upper end to the side wall of the receptacle, and co-operating clutch elements carried by the motor shaft of the upper end of the agitator for centering the agitator in the receptacle and for connecting the agitator in driven relation to the motor.

7. In a drink mixer, a motor having a downwardly projecting shaft, a receptacle support located beneath said motor, a receptacle adapted to be disposed on said support, a rotatable agitator connected with said receptacle and held for rotation therein by a single universal bearing located in the lower central portion of the receptacle, and co-operating clutch elements on the motor shaft and the upper end of the agitator adapted to center the agitator in the receptacle and to connect the agitator in driven relation to the motor.

8. In a drink mixer, a container-agitator unit comprising an open top receptacle by and in which is carried a rotatable agitator pivoted to the lower central portion of the receptacle for rotation and deflection of its upper end to any one of a plurality of positions around the upper edge of the container, but retained against removal from said container.

In witness whereof, we hereunto subscribe our names this 29th day of June, 1925.

RUSSELL A. BLISH.
STEPHEN J. POPLAWSKI.